Sept. 6, 1927.

L. W. STONEQUIST ET AL 1,641,609

ADVERTISING DEVICE

Filed March 1, 1920

Inventors:
Lawrence W. Stonequist.
Charles Rottum
Arthur J. Stonequist.
By Parker Carter
Attys

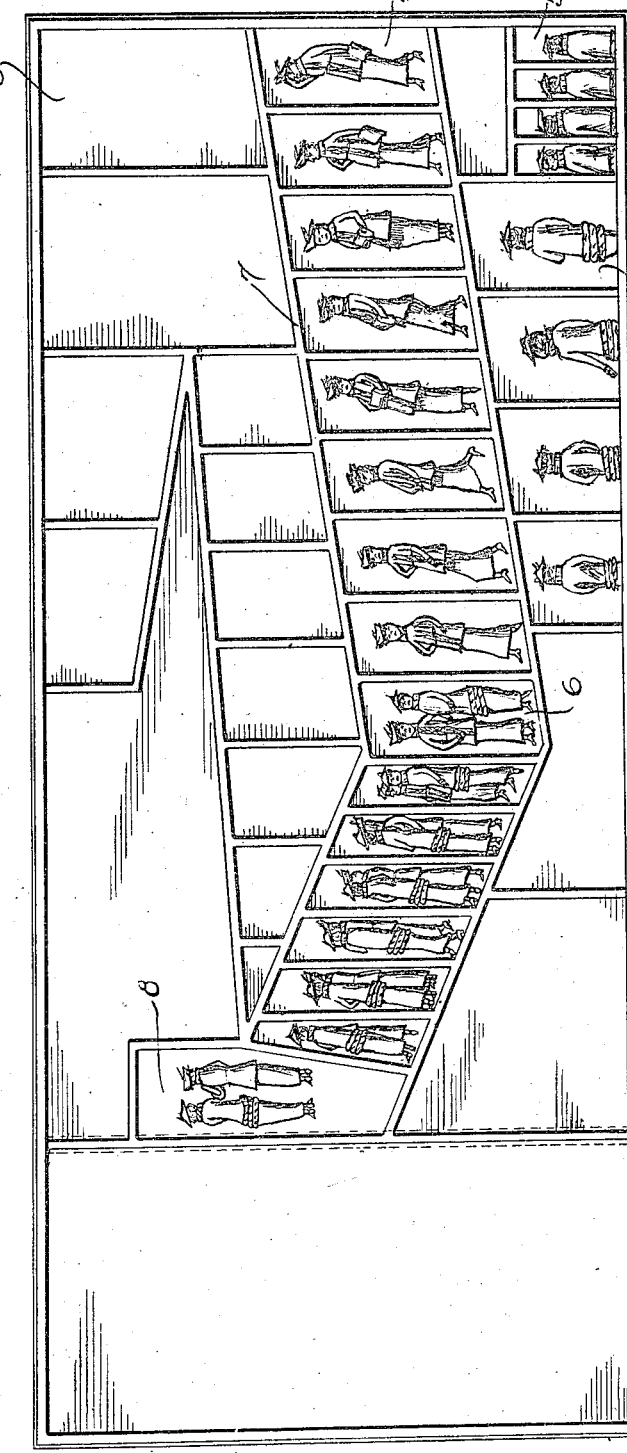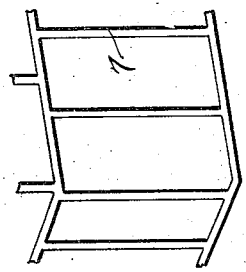

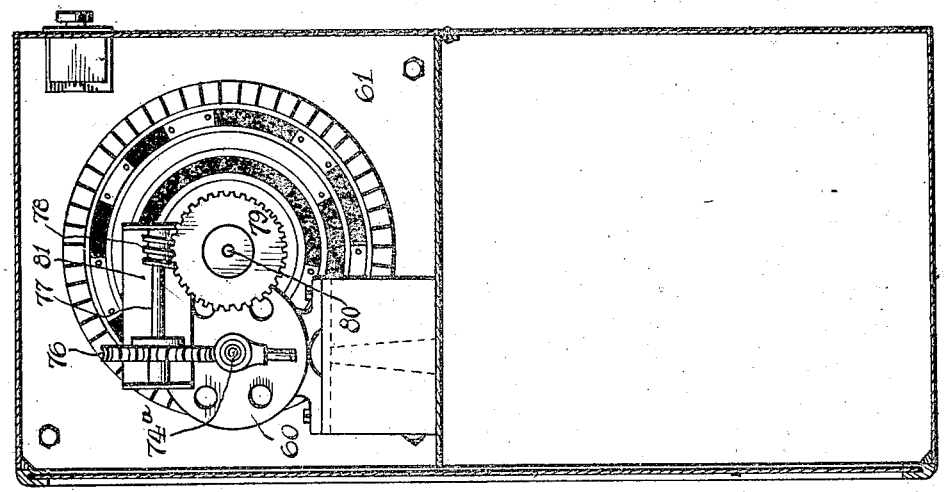
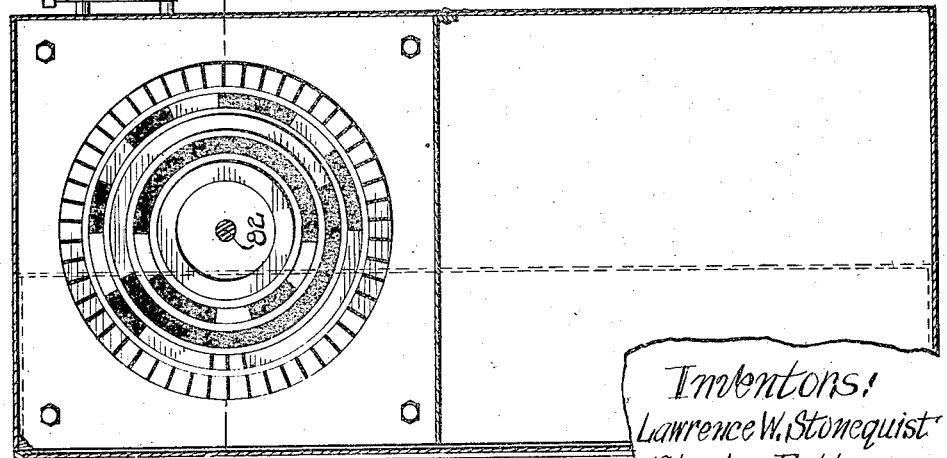

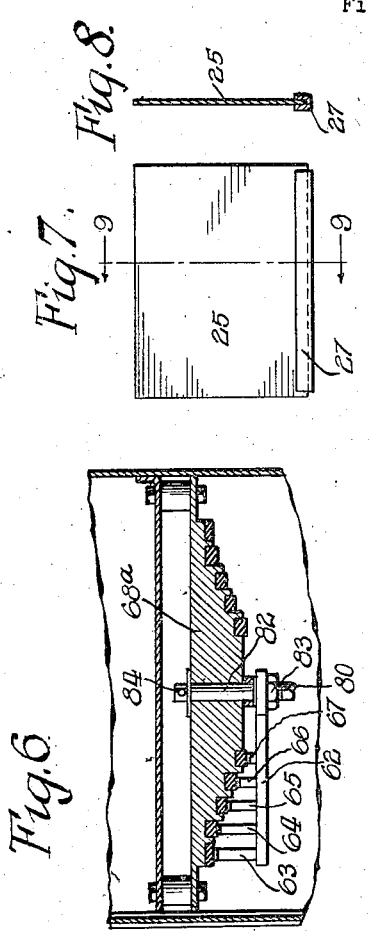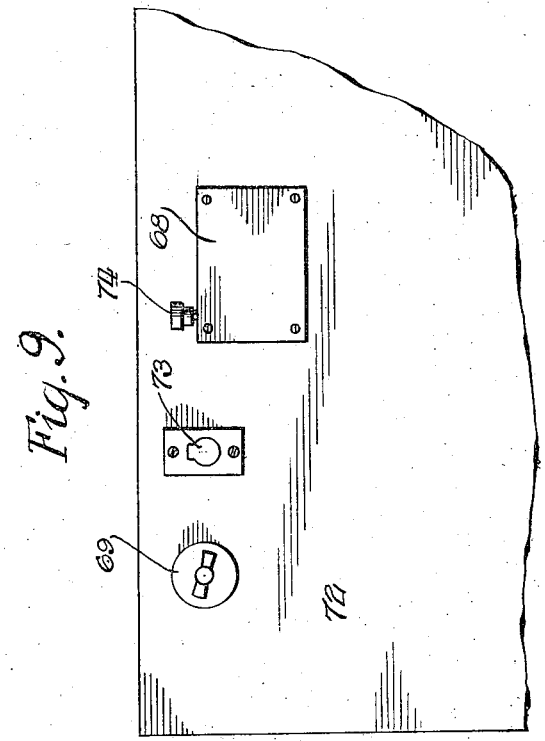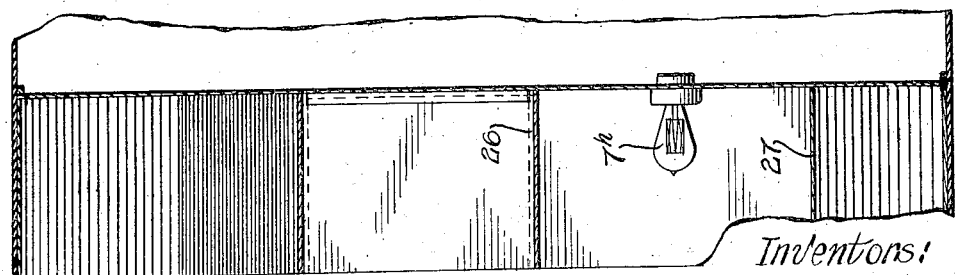

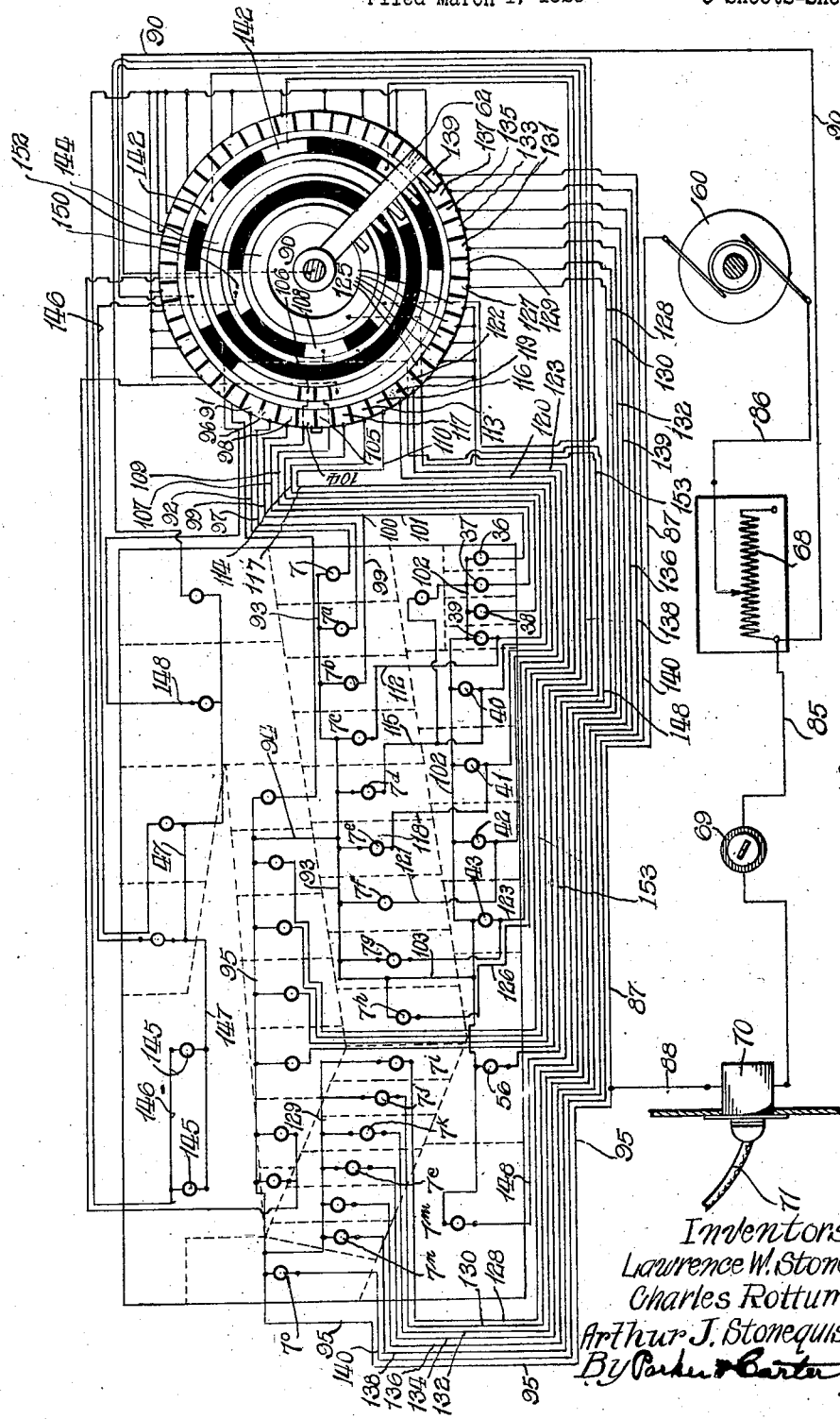

Patented Sept. 6, 1927.

1,641,609

UNITED STATES PATENT OFFICE.

LAWRENCE W. STONEQUIST, CHARLES ROTTUM, AND ARTHUR J. STONEQUIST, OF CHICAGO, ILLINOIS.

ADVERTISING DEVICE.

Application filed March 1, 1920. Serial No. 362,605.

This invention relates to advertising devices and has for its object to provide a new and improved device of this description. The invention has among other objects to provide a device which can be located at any desired point and which will give the effect of moving figures by means of the manipulation of a series of lights. The invention has other objects which are more particularly described in the following description.

Referring now to the accompanying drawings

Fig. 2 is a rear view of the front side of the device;

Fig. 3 is a view of the circuit controlling contacts;

Fig. 4 is a view similar to Fig. 4 showing the motor and driving connection to the circuit controlling device;

Fig. 5 is a sectional view taken on line 5—5 of Fig. 1;

Fig. 6 is a sectional view taken on line 6—6 of Fig. 3;

Fig. 7 is a view of one of the partitions;

Fig. 8 is a sectional view through one of the partitions showing the guide therefor;

Fig. 9 is a view showing the controlling switches;

Fig. 10 is a diagrammatic view showing the electric circuits;

Like numerals refer to like parts throughout the several figures.

Figure 1:
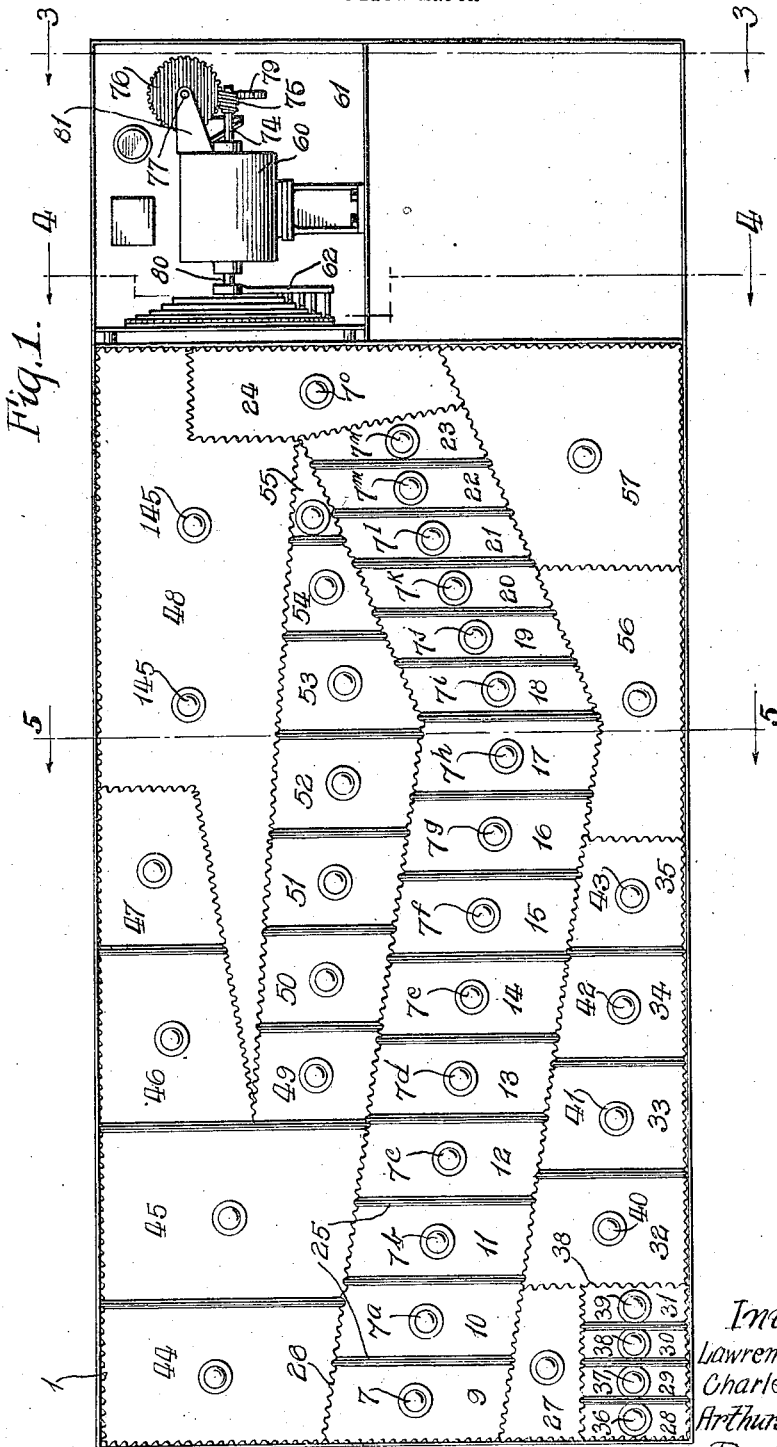
Fig. 1 is a view with the front side of the device removed showing the interior.

In the particular device shown for purposes of illustration, we have shown one form of device embodying the invention the form being simplified to facilitate the explanation and make the invention readily understood. In this construction we provide a suitable casing 1 containing the mechanism and provided with a transparent or translucent front 2. This front for example may be glass and is preferably removable from the casing. Back of the front 2 is a film 3 (see Fig. 2) carrying a series of pictures, characters or other devices which it is desired to represent as moving. These pictures or characters are located on the back of the film so that they do not show under ordinary conditions and Fig. 2 is a view of the back of this film or sheet. It will thus be seen that the figures to be displayed cannot be seen from the front of the device when it is not operating. It will further be seen that only one sheet or film is necessary. Some means is provided for producing a light back of the figures so as to make them visible from the front of the device. When a moving figure is provided the lighting means is arranged so as to successively produce a light back of the several figures. These figures are arranged in different positions so that as the light effect is successively produced the figure seems to move forward from point to point by providing as it were a moving figure. In the particular construction illustrated we have arranged a series of lights in a series of compartments back of the figures, one compartment for each figure or group of figures, the arrangement being such that the light will not be transmitted from one compartment to the other thus lighting up only one figure or set of figures at a time.

In the construction shown we have provided one set of figures 4 (see Fig. 2) which in this case is illustrated as a woman walking. There is another set of figures 5 which also illustrates a woman walking, and the arrangement is such that these two women meet at 6 and then pass along together to the door 8 of a house or store and pass into this door. The figures illustrated in Fig. 2 are reversed as this is the back of the sheet or film carrying the figures. When in position the figures move from left to right.

In Fig. 1 we have shown the casing 1 with the front and the film or sheet removed. In the casing are a series of compartments 9 to 24 inclusive. The compartments 9 to 17 are back of the set of figures extending in Fig. 2 from the right hand edge to the point, 6, while the remaining compartments are back of the two figures extending to the door. These compartments are provided with lights 7 to 7o which are preferably electric lights. The compartments are formed by walls 25 which are preferably removable and adjustable so that the compartments may be made of any desired size to accommodate figures of any desired size. A simple way of making these compartments adjustable is to form the top and bottom of the walls 26 and 27 of corrugated metal. The side walls 25 may be also made of metal and may be slipped into one of the grooves as illustrated. In order to adjust the size of the compartments it is only necessary to pull out the side wall and move it to a different position. The second set of figures 5 are arranged in front of the compartments 28 to 35 inclusive (see Fig. 2) each of which contains a light 36 to 43 inclusive. We may combine with the moving characters certain stationary pictures, such as advertisements or the like, and we have shown a series of compartments 44 to 57 inclusive which can be used for this purpose. Some of them can be used for the moving characters if desired. It is desirable to arrange the characters so that the light from one compartment will be confined to one character or set of characters and will not leak into an adjacent compartment. In the particular construction shown we provide for this purpose gaskets between the walls 25, 26 and 27 and the sheet carrying the characters. In Fig. 2 we have shown these gaskets surrounding the characters but, of course, they may be arranged in any desired manner. Some suitable mechanism is provided for lighting the lights at the proper time. For purposes of illustration we have shown a contact device operated by a motor 60 which in this instance is shown in a compartment 61 at the end of the casing 1. This motor rotates a contact arm 62 (see Figs. 1, 6 and 10). This contract is provided with a series of contacts 63 to 67 inclusive, which during the rotation of the arm engage contacts on the contact support 68$^a$. This contact support is arranged with an inclined face, that is, is formed conical or higher at the center than at the edges, so that the several sets of contacts may be arranged at different levels as clearly illustrated in Fig. 6.

In Fig. 10 I have shown a diagrammatic arrangement of the several circuits including the motor 60, the rheostat 68, the switch 69 and the plug 70, by means of which the entire device may be connected in circuit by means of a cord 71. The switch 69 may be placed on the back 72 of the casing as illustrated in Fig. 10 and the plug may be inserted in position by lifting the hinged cover 73 which covers the opening into which the plug is received. The rheostat 68 may also be placed on the back of the casing and the resistance is controlled by the arm 74. The arm 62 must be rotated at a comparatively low speed. Some means is therefore provided for reducing the speed of the motor 60. We have provided a compact, simple construction for this purpose whereby all the parts are mounted upon the motor frame so as to facilitate the installing and the operation of the device and insure its proper operation under the various conditions presented. In the construction shown (see Figs. 1 and 4) the motor shaft 74$^a$ is provided with a worm 75 which engages a worm gear 76 on a shaft 77. This shaft is provided with a worm 78 which engages a worm gear 79 on a shaft 80. The contact arm 62 is connectetd with this shaft 80. The shafts 77 and 80 are mounted in a bracket or support 81 attached to the motor frame, thus forming a compact, self-contained structure. The contacts 63 to 67 inclusive are spring contacts and are pressed against the stationary contacts so as to exert the desired amount of pressure thereon. This pressure may be secured in any desired manner. As shown for example in Fig. 6 the piece 82 upon which the arm is mounted, is provided with a lock nut 83 which engages the arm, and is provided with an opening through which a pin 84 passes. It will be seen that by pressing the part 82 inwardly a sufficient amount to get the desired pressure, and then inserting the pin, the pin will prevent the retraction of the parts and hold the spring contacts against the stationary contacts with the desired pressure.

Referring to Fig. 10 where we have shown the circuits diagrammatically, we have illustrated the circuits as those seen from the back of the apparatus. The lamps therefore will be in the reverse order to those shown in Fig. 1. The contact arm 62 is shown as near the end of its movement, that is to say, in a position where it is controlling lamps 7$^n$ and 7$^o$. The current comes in through the plug 70, passes along wire 85 till it reaches the resistance 68 where it divides, a portion going through the resistance 68, conductor 86, motor 60, conductor 87 and conductor 88, back to the plug 70 and out to the main line. The remaining current passes through conductor 90 to the moving contact arm 62 and then passes through the series of outer stationary contacts to the various lamps and back to the plug 70. If now the contact arm 62 is moved around until the spring contact 63 engages the stationary contact 91, the current will pass from the plug 70 along conductors 85 and 90 to arm 62, then through contact 91 and conductor 92 to lamp 7, and thence by conductors 93, 94 and 95 to conductor 88 and plug 70, and thence out to the main circuit. This lights the light 7 and brings to view the figure or character in front of it. When the spring contact reaches stationary contact 96, the current passes to the contact arm as before and thence through conductor 97 and lamp 7$^a$ to conductor 93 and thence back to the plug as before through conductors 94 and 95. The light 7 has now been extinguished and the light 7$^a$ lighted, which brings to view the figure in front of light 7$^a$. When the contact arm reaches the contact 98, the current passes to the arm as before and then through conductor 99 to the point 100, whence it provides a portion continuing along the conductor 99 to lamp 7$^b$ and thence back to the plug, another portion continuing along conductor 101 to lamp 36, thence along conductor 102 to a conductor 103, and thence to conductor 93, and thence through conductors 94 and 95 back to the plug. This lights the light 36 and the light 7$^b$ and brings the two characters in front of these lights in view, that is to say one character in the set 4 and one character in the set 5. When the contact arm passes contact 104 the light 7$^b$ remains lighted because the contacts 98, 104 and 105 are tied together. In this position the spring brush 64 engages the contact 106 in the second series of contacts. The current then passes from the contact arm, through the contact 106 to conductor 107, thence to lamp 37, thence to conductors 102, 103, 93 and 95, back to the plug. This lights the light 37. When the brush contact and the contact arm reaches contact 105 which is tied to 104 and 98, the lamp 7$^b$ is still kept lighted. The brush 64 passes from contact 106 to contact 108, thence by conductor 109 to lamp 38, thence through conductors 102, 103, 93 and 95 back to the plug. This lights light 38 and brings to view the figure or character in front of this light. The contact arm then moves until the spring contact 63 engages contact 110. The current then passes to the contact arm 62 as before and then through contact 110, thence through conductor 111 through lamp 39 and thence through conductors 102, 103, 93, 94 and 95 to the plug 70. The current divides just before reaching lamp 39, a portion passing through conductor 112 and thence through lamp 7$^c$ and thence through conductors 93, 94 and 95 to the plug 70. This simultaneously lights lights 39 and 7$^c$ and brings the figures in front into view. The lights 38 and 7$^b$ have now been extinguished by the movement of the spring contact from the contacts through which they receive current. The contact arm then moves to contact 113 whereupon the current passes as before to the contact arm and thence through contact 113 and conductor 114 to lamp 40, thence to lamp 40, thence to conductors 102, 103, 93, 94 and 95 to the plug 70. The current divides before passing through the lamp 40, a portion of said current going through conductor 115 and thence lamp 7$^d$, conductors 93, 94 and 95 back to the plug 70. This lights lights 40 and 7$^d$ and brings to view the figures in front of them. In the meantime the lights 39 and 7$^c$ have been extinguished. When the contact arm reaches the contact 116, the current passes to the contact arm as before and then passes along conductor 117 to light 41 and thence through conductors 102, 103, 93, 94, and 95 to the plug 70. The current divides just before reaching light 41, a portion thereof passing through conductor 118 and thence to light 7$^e$ and thence to conductors 93, 94 and 95 to the plug 70. This lights lights 41 and 7$^e$ and brings to view the figures in front thereof. In the meantime, the lights 40 and 7$^d$ have been extinguished. The contact arm then moves to contact 119. The current then passes to the arm as before and thence to conductor 120 to lamp 42 and thence to conductors 102, 103, 93, 94 and 95 to the plug 70. The current divides just before it reaches light 42 and passes through conductor 121 and thence to light 7$^f$ and thence to conductors 93, 94 and 95 back to the plug 70. The contact arm then passes to contact 122. The current then passes to the arm as before and thence to conductor 123 and thence to lamp 43 and conductors 102, 103, 93, 94 and 95 to plug 70. The current divides just before it reaches lamp 43, a portion thereof passing through conductor 124 and thence through light 7$^g$ and thence to conductors 93, 94 and 95 to the plug 70. This lights lights 42 and 7$^f$ and brings into view the figures in front of them. The lights 41 and 7$^e$ in the meantime are extinguished. The contact arm then moves to contact 125. The current passes to the arm 62 as before and thence to conductor 126 to light 7$^h$ and thence to conductors 93, 94 and 95 to the plug 70. This lights the light 7$^h$. This is the light back of the point where the two figures join in Figure 3, that is the point six and when this light is lighted it brings the two figures together as shown at six in Figure 2. It will be noted that there are several contacts 125, all connected to the conductor 123. This causes the light 7$^h$ to be lighted for a longer period than the other lights to indicate for example that when the two figures join they stand for a little while conversing. They then pass on into the doorway 8. As the contact arm moves along, it reaches the contact 127. The current then passes from the arm 62 to conductor 128 and thence to light 7$^i$ and thence by conductors 129 and 95 to the plug 70. This lights light 7$^i$ and brings into view the figures in front of it. In the meantime light 7$^h$ has been extinguished. The contact arm then moves to the contact 129 and the current then passes from the arm 62 to conductor 130 and thence to the light 7$^j$ and thence to conductors 129 and 95 to the plug 70. This lights light 7$^j$ and brings figures in front of it in view. The light 7$^i$ in the meantime is extinguished. The contact arm then moves to contact 131 and the current passes from said contact arm to conductor 132 to light 7$^k$ and thence by conductor 129 and 95 to the plug 70. This lights light 7$^k$ and brings the figures in front thereof in view, the light 7$^j$ being in the meantime extinguished. The contact arm then moves to contact 133 and the current passes from the arm 62 to conductor 134 to light 7$^e$ and thence by conductors 129 and 95 to the plug 70. This lights light 7$^e$ and brings the figures in front of it in view, the light 7$^k$ in the meantime being extinguished. The contact arm then passes to contact 135 and the current passes from the contact arm 62 to conductor 136 to light 7$^m$ and thence by conductors 129 and 95 to the plug 70. This lights light 7$^m$ and brings the figures in front of it in view. The light 7$^l$ in the mean time has been extinguished. The contact arm then passes to contact 137 and the current passes from said arm to conductor 138 to light 7$^n$ and thence to conductors 129 and 95 to plug 70. This lights light 7$^n$ and brings the figures in front of it in view, the light 7$^m$ in the mean time being extinguished. The contact arm then moves to contact 139 and the current then passes from the contact arm through conductor 140 to light 70 and thence by conductor 95 to the plug 70. This lights light 7$^o$ and brings the figures in front thereof in view, the light 7$^n$ in the mean time having been extinguished. This particular light happens to be the light at the doorway 8 (see Figure 2) where the figures disappear into the building. It will thus be seen that the various figures are successively brought into view and then disappear, thus forming the appearance of movement of the figures. These figures can be arranged in a walking, running or other moving attitude so as to produce any effective movement desired. We have shown a simple construction in order to make the invention clear but it is of course evident that the arrangement can be expanded as desired. The second set of stationary contacts may consist of a series of contacts 142 which may be of considerable length and which are connected to lights of advertisements or for other purposes. These lights will be lighted a considerable length of the time so as to show any desired stationary advertisement in connection with moving figures. The third set of contacts may contain a long contact 144 which may be connected with a light or lights back of the stationary advertisement which light or lights will be in circuit for a comparatively long time so as to keep this stationary advertisement in view. This particular contact is connected with the lights 145. The current passes to the arm 62 as before described and then passes to contact 144 and conductor 146 to the lights 145 and then by conductors 147 and 148 to conductor 103 and thence by conductors 93, 94 and 95 to the plug 70. The fourth set of stationary contacts may be provided with a series of contacts 150 which may also light lights for any suitable advertisements. The fifth contact as here illustrated consists of a single continuous contact 152. The current passes from the contact arm 62 to this contact and thence by conductor 153 to light 56 and thence by conductors 103 93, 94 and 95 to the plug 70. It is of course evident that these stationary contacts may be arranged in any desired manner to secure any desired result and we have simply shown certain arrangements in order to make the explanation of the device clear. We have described in detail a particular construction embodying the invention but it is of course evident that the parts may be varied in many details without departing from the spirit of the invention as set forth in the claims herein filed and we therefore do not want to limit ourselves to the particular construction shown. The stationary advertisements may be of any desired form and may be either arranged so as to be normally out of sight when the lights are not lighted or may be arranged on the outer surface so as to be inside as shown at 155 of Figure 2.

The use and operation of our invention are as follows:—

The device may be used at any place desired. It may be located in show windows. It may be located outdoor or inside of buildings or wherever the conditions make suitable. When in position the motor is set in operation. This moves the contact arm 62 along the contacts of the stationary contact device shown in Figure 7 and successively lights the various lights. The characters or pictures for representing movement are arranged so as to be normally out of sight. As the contact arm moves along the stationary contacts, the lights are successively lighted and extinguished and this brings the figures succesively into view. When the particular arrangement of figures shown in the drawings are used, the different figures in series four and five are successively brought into view so as to represent movement of these two figures and then when the point six is reached, Figure 3, the two figures come together, pause for a moment and then move along together into the door 8, thus forming the appearance of movement whereby two figures move along in different paths and then meet and move along the same path. This may be repeated over and over as the contact arm 62 rotates. The device therefore needs no attention and when once set in operation will continue to operate as long as desired. The motor is controlled by the rheostat 68 and the current through the motor and the lights is controlled by the switch 69 and the plug 70. When the device is to be operated, the plug may be placed in position and then by means of an ordinary cord 71 it may be connected with a suitable socket at any convenient point.

We claim:

1. An advertising device comprising a casing, a series of compartments in said casing, lights in said compartments, the side walls of said compartments being adjustable to vary the size thereof, characters in front of said compartments and normally concealed from view, the characters only being in view when the lights are lighted, means for successively lighting said lights so as to successively bring said characters into view to form the appearance of movement.

2. An advertising device comprising a casing, two series of compartments in said casing, lights in said compartments, characters in front of said compartments and normally concealed from view when the lights are not burning but exposed to view when the lights are burning, means for successively lighting said lights in the two series of compartments so as to expose the characters and produce the appearance of movement of two different characters, and means for transferring the character associated with one series of compartments to the other series of compartments at some point intermediate the ends of said series so that the two characters join for the rest of the apparent movement.

Signed at Chicago, in the county of Cook and State of Illinois, this 31st day of January, 1920.

LAWRENCE W. STONEQUIST.
CHARLES ROTTUM.
ARTHUR J. STONEQUIST.